Dec. 15, 1959  L. J. LEMOINE  2,916,770
PLASTIC INJECTION MOLDING MACHINE
Filed Jan. 14, 1958
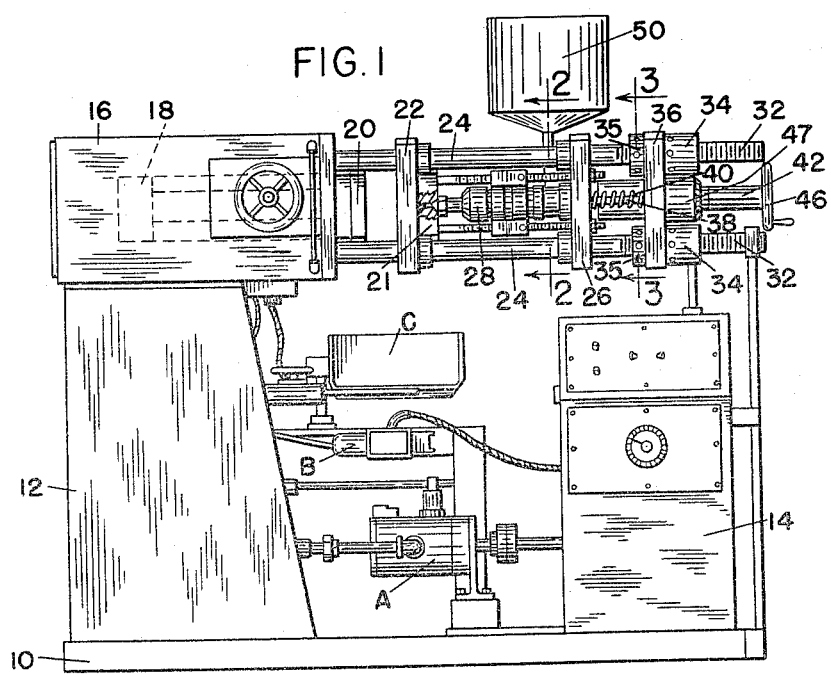
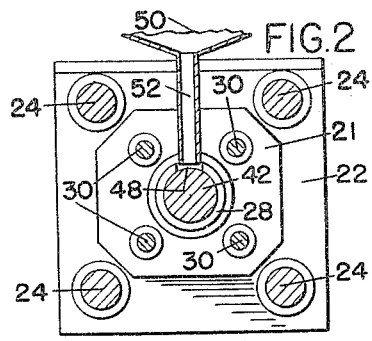
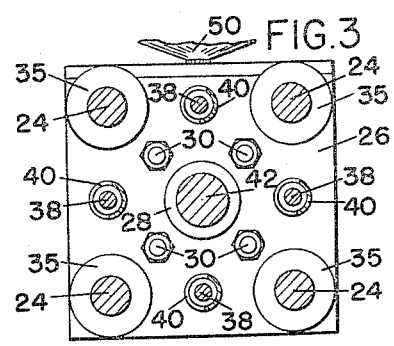
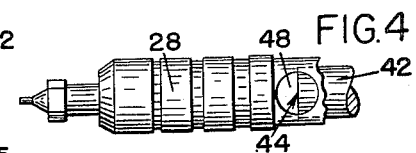
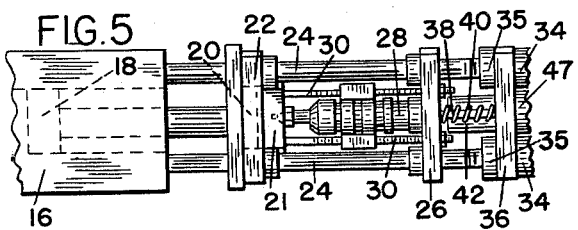
INVENTOR
LEONARD J. LEMOINE
By Charles R. Fay,
ATTORNEY

United States Patent Office 2,916,770
Patented Dec. 15, 1959

2,916,770

PLASTIC INJECTION MOLDING MACHINE

Leonard J. Lemoine, Leominster, Mass.

Application January 14, 1958, Serial No. 708,862

1 Claim. (Cl. 18—30)

This invention relates to a new and improved plastic injection molding machine, and the principal object of the invention resides in the provision of but a single ram both for operating the dies to open and close the same and to perform the injection action of the injection cylinder, in a timed sequence; and the provision of a plastic injection molding machine comprising a base mounting thereon a series of bars, there being slidably mounted upon said bars a die-closing block and an injection cylinder supporting block, the same being rigidly secured together in spaced relation together with an abutment mounted upon said rods and provided with resilient means resisting the motion of the die-closing block and the cylinder supporting block as a unit, there being a ram for moving the dies to the die-closing block and at the same time moving the latter and the injection cylinder in the same direction against the action of a relatively fixed plunger in the injection cylinder, whereby plastic material in the cylinder is caused by the plunger to be ejected therefrom to the die, forming an article in the die as is usual; and the provision of a plastic injection molding machine as above described in which the ram retracts the dies, causing the same to open and the springs to retract the die-closing block and the injection cylinder holding block to provide for repetition of the cycle.

Other objects of the invention include the provision of a novel hopper for the plastic powder, the same being connected with the injection cylinder and the opening therein from the hopper to the cylinder being adjusted in size simply by adjusting the longitudinal position of the fixed plunger above described, for varying the powder charge applied to the cylinder.

Other objects and advantages of the invention will appear hereinafter.

Reference is to be had to the accompanying drawings, in which

Fig. 1 is a view in front elevation of a machine embodying the invention;

Figs. 2 and 3 are enlarged sections on lines 2—2 and 3—3 in Fig. 1;

Fig. 4 is an enlarged plan view of the injection cylinder showing its relation to the plunger;

Fig. 5 is a partial view illustrating the various blocks and the injection cylinder in injection position; and Fig. 6 is a diagrammatic view showing the injection cylinder in injection position.

In carrying out the present invention, there is provided a machine base 10 and housings, uprights or standards 12 and 14 may be provided at opposite ends of the base in order to support mechanism to be described. There may be also provided various conventional parts for the machine such as the pressure tank A, control apparatus B, and the supporting pan C.

In any event, at one end of the machine as on standard 12, there is provided a housing 16 containing a ram 18. This ram is used for opening and closing the die part 20 with relation to die part 21 on die block 22. This is more or less conventional and will be readily understood by those skilled in the art.

Supported from housing 16 and from standard 14, or in any way desired, there are four relatively large spaced horizontal slide rods 24 which are fixed in position and provide a sliding support for die block 22 and also for another slidable block 26 upon which is mounted in fixed relation thereto the injection cylinder 28.

This injection cylinder may be provided with the usual heating means, etc., nozzle and other appurtenances normally found in devices of this nature but in any event it is pointed out that this cylinder is slidable with block 26 on the rods 24, and has its nozzle operatively associated with die part 21.

Blocks 22 and 26 are tied together by means of adjustable screw-threaded rods 30 so that although they are mutually longitudinally adjustable along the rods 24, nevertheless they are fixed together and move together as a unit.

At the right-hand end of rods 24 in Fig. 1, it will be seen that the same are threaded as at 32 and large adjusting nuts 34 are mounted thereon and support in turn a block 36. This block is adjustable on rods 24 but is fixed in operative relation thereon and is not intended to slide in any manner. The nuts 34 may be provided with lock nuts 35 firmly holding block 36 in fixed position.

On block 36 there are provided a series of rods 38 which are fixed with relation either to block 26 or block 36, being slidable relative to the other block. These rods are provided with coil springs 40 thereabout and as the unit comprising block 22, block 26, and cylinder 28 moves to the right against the action of springs 40, these springs are compressed and thereafter return the assembly to its original position.

Mounted in block 36, there is a slidable plunger or piston 42 having a plane transverse forward pressure face 44, see Fig. 4. Plunger 42 is provided with a hand wheel 46 and is threaded with relation to a fixed nut 47 also mounted on plate 36, whereby plunger 42 may have its longitudinal position adjusted with respect to the cylinder 28 into which it extends from the rear thereof, see Figs. 4 and 6.

The cylinder 28 is provided with a circular opening in the top portion thereof as at 48 and when the machine is idle, the forward pressure face 44 of plunger 42 is aligned with this hole as shown in Fig. 4. A hopper 50 is arranged in any desired manner on the machine and it is provided with a passage 52 aligned and connected with the opening 48 for the discharge by gravity of plastic powder into the injection cylinder 28.

As shown in Fig. 4, the forward pressure face 44 of the plunger 42 is located approximately on a diameter with respect to opening 48, and it will be appreciated that a certain charge only of plastic powder will be enabled to descend upon each reciprocation or cycle of the machine, through the discharge opening which is as shown in Fig. 4, one-half of the total opening 48. However, plunger 42 may be adjusted longitudinally as described above to make this opening either larger or smaller to thereby and in the same proportion vary the charge of plastic powder from hopper 50 into cylinder 28.

With the parts as shown in Fig. 1, the ram moves to the right, closing the die part 20 with respect to die part 21 on block 22. As soon as the die is closed, die block 22 being impinged upon by the die 20, is moved to the right under influence of the ram. This action of course also moves block 26 in the same direction, as well as the injection cylinder 28.

In this relation, the parts move to the right until the position shown in Figs. 5 and 6 is reached, at which time the pressure end of piston 42 has moved sufficiently through the cylinder 28 to cause the injection operation to take place through the nozzle.

The ram then starts its return travel; the springs 40 cause blocks 26 and 22 to follow along to original position, and when they have reached their limit of motion to the left, the die part 20 keeps on retracting and thereby opens the die.

It will be seen that this invention provides a relatively uncomplicated and less expensive plastic injection molding machine which uses but a single ram to accomplish the opening and closing of the dies as well as the injection operation itself. The ram causes the opening and closing of the dies and motion of the injection cylinder 28 relative to the piston 42 in one direction, the springs 40 moving the injection cylinder block 26 and the die block 22 back to original position thereof for continuation of the molding cycle.

The adjustment of injection nozzle to die part 21 is easily accomplished by manipulation of rods 30, and the charge from the hopper to the cylinder by hand-wheel 46. The action is automatic, and the machine may be started and run as long as desired, it being only necessary to replenish the hopper 50 and remove the molded articles from between the parts 20 and 21 when the die is open.

The novel single ram operation as described provides the very important feature of runnerless molding of plastic articles whether there be one or more cavities in the mold and whether the weight be 1 oz. or less or more without limit.

This operation eliminates the unnecessary molding of gates and runners, but does not necessarily exclude or negate the conventional method of molding with sprue runners, gates, etc. The capacity and size of this machine is unlimited as well as the weight of the shot which it will mold.

Having thus described my invention and the advantages thereof, I do not wish to be limited to the details herein disclosed, otherwise than as set forth in the claim, but what I claim is:

A plastic injection molding machine comprising a base, a ram cylinder mounted on said base, a ram slidably received in said ram cylinder, a plurality of spaced parallel slide rods fixed to said ram cylinder and projecting axially therefrom in surrounding relationship to said ram, a die part carried by said ram, a die block slidably mounted on said rods, a second die part carried by said die block in alignment with said first die part, a cylinder block slidably mounted on said rods, an injection cylinder carried by said cylinder block in opposed relation to said die block, an injection nozzle on one end of said injection cylinder cooperating with said second die part, the opposite end of said injection cylinder being open, adjustable means connecting said die block and said cylinder block together as a unit and providing for adjustment of said cylinder block, injection cylinder and nozzle with respect to said second die part, said injecting cylinder having an aperture in the wall thereof, a hopper connected to said cylinder block and communicating directly with the aperture for supplying plastic material by gravity to said injection cylinder at each reciprocation of the cylinder block, a piston block adjustably fixed on said rods in spaced relation to said cylinder block, a piston mounted for axial adjustment on said piston block and having one end slidably disposed in the open end of said injection cylinder, said piston having a forward face for injection of the plastic through the nozzle upon motion of the cylinder block in a direction to force the said forward face of the piston toward the nozzle, the piston closing the aperture during the motion period and cutting off the supply of molding powder, the aperture being reopened upon motion of the cylinder block in the opposite direction for a free flow of a metered amount of powder into the cylinder just in front of said piston face, the amount of powder in each charge depending on the axial position of adjustment of the piston, and spring means disposed between said cylinder block and said piston block to urge said last-named blocks apart and retract said piston upon completion of an injection stroke.

References Cited in the file of this patent

UNITED STATES PATENTS

| | | |
|---|---|---|
| 2,519,255 | Knowles | Aug. 15, 1950 |
| 2,582,260 | Kutik | Jan. 15, 1952 |
| 2,680,883 | Ashbaugh | June 15, 1954 |
| 2,785,439 | Gastrow | Mar. 19, 1957 |